United States Patent
Tamai

(10) Patent No.: US 8,279,967 B2
(45) Date of Patent: Oct. 2, 2012

(54) CDM SIGNAL TRANSMITTER WITH MODULATORS REDUCED IN NUMBER AND A METHOD THEREFOR

(75) Inventor: Hideaki Tamai, Kanagawa (JP)

(73) Assignee: Oki Electric Industry Co., Ltd., Tokyo (JP)

( * ) Notice: Subject to any disclaimer, the term of this patent is extended or adjusted under 35 U.S.C. 154(b) by 651 days.

(21) Appl. No.: 12/458,190

(22) Filed: Jul. 2, 2009

(65) Prior Publication Data

US 2010/0002799 A1   Jan. 7, 2010

(30) Foreign Application Priority Data

Jul. 3, 2008   (JP) ................................. 2008-174646

(51) Int. Cl.
 *H04L 27/00* (2006.01)
(52) U.S. Cl. ........ 375/290; 375/295; 375/140; 375/141; 375/146; 375/142; 375/143; 375/144; 370/479
(58) Field of Classification Search .................. 375/295, 375/140, 141, 146, 142, 143, 144; 370/479
 See application file for complete search history.

(56) References Cited

U.S. PATENT DOCUMENTS

| | | | | |
|---|---|---|---|---|
| 5,936,997 A | * | 8/1999 | Kanda | ............................ 375/144 |
| 7,342,909 B2 | | 3/2008 | Matsuno et al. | |
| 2001/0040913 A1 | * | 11/2001 | Arai et al. | ...................... 375/144 |
| 2010/0067550 A1 | * | 3/2010 | Tamai | ........................... 370/479 |

FOREIGN PATENT DOCUMENTS

| | | |
|---|---|---|
| GB | 2347324 A | 8/2000 |
| WO | WO-99/39474 | 8/1999 |

* cited by examiner

*Primary Examiner* — Siu Lee
(74) *Attorney, Agent, or Firm* — Rabin & Berdo, P.C.

(57) ABSTRACT

A code division multiplex signal transmitter includes an operational circuit, a modulator unit and a multiplexer. The operational circuit adds up input transmission data on channels to produce resultant added data and modulates pieces of bit transmission data which are indicative of the values of the respective bits of the added data, when expressed in binary form, the pieces of bit transmission data being equal in number to the M bit positions of the added data expressed in binary form. The modulator unit includes modulators corresponding in number to the M bit positions of the added data in the binary form. A k-th modulator, where k is an integer of 1 to M, inclusive, modulates a k-th piece of bit transmission data to produce a k-th bit modulated signal whose amplitude level is $2^{k-1}$. The multiplexer multiplexes first to M-th bit modulated signals to produce a code division multiplex signal.

3 Claims, 3 Drawing Sheets

→ TIME

CDM SIGNAL TRANSMITTER WITH MODULATORS REDUCED IN NUMBER AND A METHOD THEREFOR

BACKGROUND OF THE INVENTION

1. Field of the Invention

The present invention relates to a code division multiplex signal transmitter, and more particularly to a code division multiplex signal transmitter for use on a transmitting end in a code division multiplex communication system. The present invention also relates to a code division multiplexing method therefor.

2. Description of the Background Art

A telecommunications network system relying upon the code division multiplexing (CDM) allows several pieces of transmission data to be multiplexed into one time slot. The CDM technique may, when applied to a telecommunications system, advantageously transmit large volumes of data with communications resources such as time slot saved, thus being put to practical use mainly in mobile communications.

Now, with a conventional CDM signal transmitter disclosed by, for example, U.S. Pat. No. 7,342,909 to Matsuno et al., a CDM signal transmitter is supplied with transmission data on a plurality (N) of channels, which will in turn be encoded by corresponding plural encoders with codes assigned to the respective channels. The resultant coded transmission data, which are binary signals having value "0" or "1", are fed to respective modulators corresponding in number to the channels. The modulators modulate in amplitude the coded transmission data to thereby produce modulated signals. In the conventional CDM signal transmitter, the degrees of modulation are equally defined between those modulators so that the amplitude levels of the modulated signals are equal to each other. The modulated signals are then delivered to a multiplexer, which in turn multiplexes the modulated signals to produce a CDM signal, which is an (N+1)-valued signal that takes on any one of values 0, 1, 2 ... and N.

However, the conventional CDM transmitter requires the modulators corresponding in number to the channels of transmission data. Thus, the number of modulators increases with an increase in number of channels, resulting in an increase in cost for required parts and components. Moreover, the circuit size of the multiplexer increases, so that the manufacture of multiplexer becomes difficult.

SUMMARY OF THE INVENTION

It is an object of the present invention to provide a CDM signal transmitter and a code division multiplexing method that allow required modulators to be reduced to curb the rising cost of parts and components and prevent the circuit size from increasing.

The inventor has made a keen study and found that modulators required can be reduced in number by adding up transmission data on a plurality of channels to produce resultant added data and modulating pieces of bit transmission data which are indicative of the values of the respective bits of the added data, when expressed in binary form, the pieces of bit transmission data being equal in number to the bit positions of the added data expressed in binary form.

In accordance with the present invention, a code division multiplex (CDM) signal transmitter comprises an operational circuit, a modulator unit and a multiplexer, wherein the operational circuit adds up transmission data on a plurality of channels to produce resultant added data and produces pieces of bit transmission data which are indicative of the values of the respective bits of the added data, when expressed in binary form, the pieces of bit transmission data being equal in number to the M bit positions of the added data expressed in binary form. The modulator unit includes modulators corresponding in number to the M bit positions. A k-th modulator, where k is an integer of 1 to M, inclusive, modulates a k-th piece of bit transmission data to produce a k-th bit modulated signal whose amplitude level is $2^{k-1}$. The multiplexer multiplexes first to M-th bit modulated signals to produce a code division multiplex signal.

In an aspect of the present invention, the operational circuit may preferably include an adder for adding up the input coded transmission data to obtain resultant added data, and a bit selector for producing the pieces of bit transmission data indicative of the values of the respective bits of the added data and equal in number to the number (M) of the bit position or positions of the added data.

In another aspect of the present invention, the offset calculator may be adapted to calculate an amount of offset adjustment A(N) in respect of to the plurality (N) of channels N by using the following formula (1):

$$A(N) = 0.5 \times (2^{a+1} - 1 - N), \quad (1)$$

where a is an integer satisfying $2^a \leq N \leq 2^{a+1} - 1$, and the CDM signal transmitter may further include an offset adjuster for adjusting a direct current (DC) level of the code division multiplex signal according to the amount of offset adjustment A(N) calculated by the offset calculator.

In accordance with the present invention, a code division multiplexing method includes the steps of: adding up input coded transmission data on a plurality (N) of channels, where N is a natural number more than unity, to produce resultant added data; producing pieces of bit transmission data which are indicative of values of respective bits of the added data, when expressed in binary form, the pieces of bit transmission data being equal in number to the number (M) of bit position or positions of the added data expressed in the binary form, where M is a natural number not less than unity; modulating a k-th piece of bit transmission data, where k is an integer of 1 to M, inclusive, to produce a k-th bit modulated signal whose amplitude level is equal to a $2^{k-1}$; and multiplexing first to M-th bit modulated signals to produce a code division multiplex signal.

In an aspect of the present invention, it is preferable that the code division multiplexing method also includes the steps of calculating an amount of offset adjustment A(N) in respect of the plurality (N) of channels by using the formula (1), and adjusting a DC level of the code division multiplex signal according to the amount of offset adjustment thus calculated.

In this way, pieces of transmission data corresponding in number to N channels are added to produce-added data and then produce pieces of bit transmission data which are indicative of the values of the respective bits of the added data, when expressed in binary form, and are equal in number to M bit positions of the added data in the binary form, and the obtained bit transmission data are multiplexed. Consequently, the number of modulators required is equal to the number (M) of the bit positions. The modulators can therefore t be reduced compared to the conventional technique.

with respect to the number of channels N, the number of bit positions M of the added data expressed in binary form is given by the minimum integer satisfying the relationship of $N+1 \leq 2^M$, that is $M \leq \log_2(N+1)$. By way of example, if the number of channels is 15, the number of modulators is then 4.

In addition, if the CDM signal transmitter further includes the offset adjuster and the operational circuit also has the offset calculator, a DC offset possibly occurring in a CDM signal depending on the number of channels N can easily be corrected.

BRIEF DESCRIPTION OF THE DRAWINGS

The objects and features of the present invention will become more apparent from consideration of the following detailed description taken in conjunction with the accompanying drawings in which.

DESCRIPTION OF THE PREFERRED EMBODIMENT

In the following, a preferred embodiment of the present invention will be described in detail with reference to the accompanying drawings which are simplified as far as the present invention can be understood. It is to be noted that the following preferred embodiment is only illustrative and is not to be intended to limit in any respect, and thus various changes and modifications may be made within the scope of the present invention.

Figure 1:
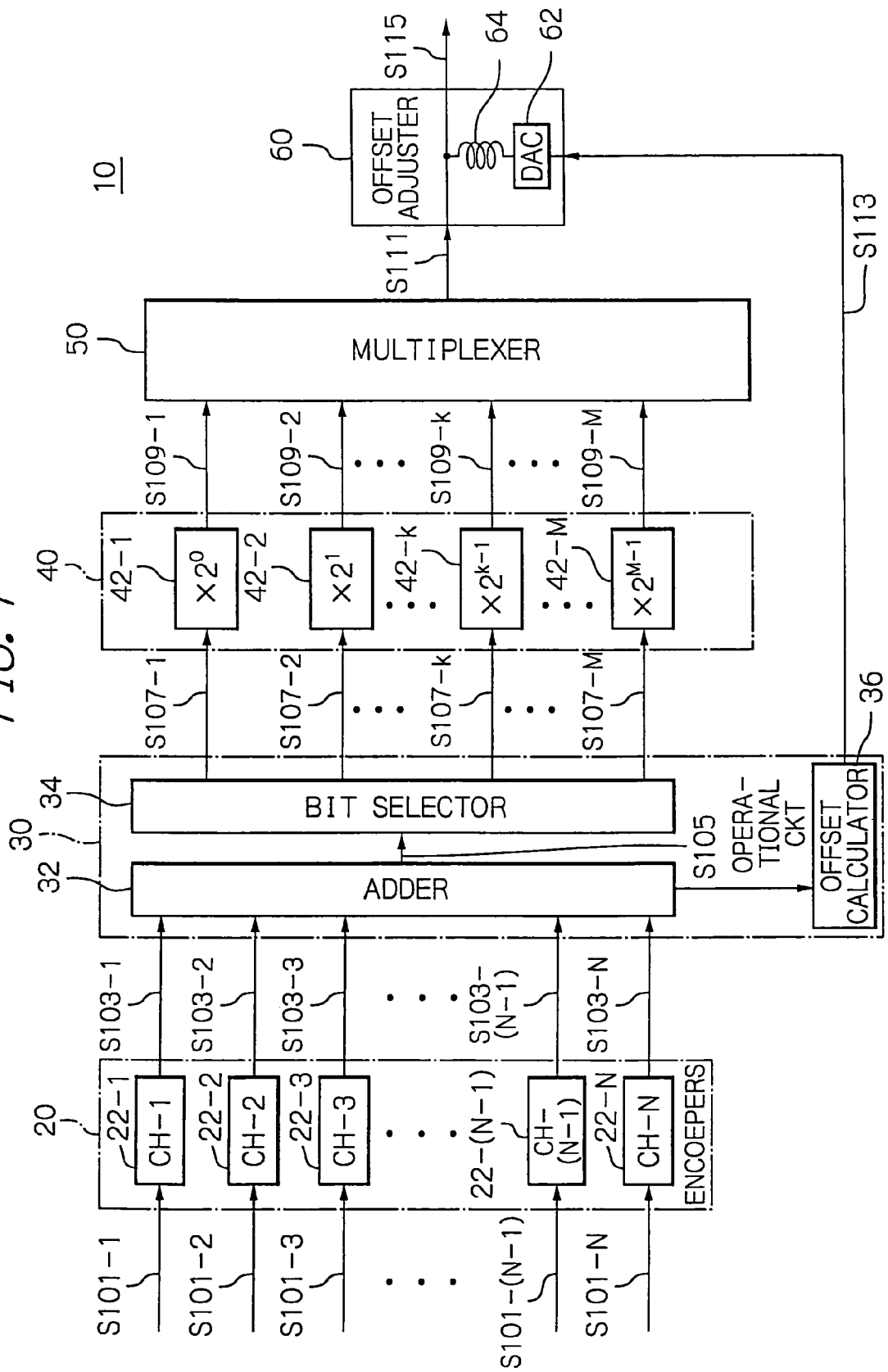
FIG. 1 is a schematic block diagram of a code division multiplex signal transmitter in accordance with a preferred embodiment of the present invention.

FIG. 1 is a schematic block diagram showing a code division multiplex (CDM) signal transmitter 10 in accordance with an illustrative embodiment of the present invention. The CDM signal transmitter 10 is fed with transmission data on a plurality (N) of channels depicted with arrows S101-1 to S101-N in the figure, where N is an integer larger than unity, to produce a CDM signal S115 from the transmission data S101-1 to S101-N.

The CDM signal transmitter 10 comprises an encoder unit 20, an operational circuit 30, a modulator unit 40, a multiplexer 50 and an offset adjuster 60, which are interconnected as illustrated.

In the CDM signal transmitter 10, the fed transmission data S101-1 to S101-N are input to the encoder unit 20. The encoder unit 20 includes encoders 22-1 to 22-N corresponding in number to the N channels, CH-1, CH-2, . . . , CH-N. Each of the first to N-th encoders 22-1 to 22-N having a unique code encodes the first to N-th transmission data S101-1 to S101-N, respectively, to thereby produce a first to N-th coded transmission data, which are represented with arrows S103-1 to S103-N in the figure. The first to N-th coded transmission data S103-1 to S103-N are spread coded data of the first to N-th transmission data S101-1 to S101-N, and formed of chips which are indicative of a binary value "0" or "1" and correspond in number to the code length. In short, the encoders 22-1 to 22-N encode the transmission data S101-1 to S101-N by using codes assigned to the corresponding channels. The first to N-th coded transmission data S103-1 to S103-N are then sent to the operational circuit 30.

The encoders 22-1 to 22-N may be constituted similarly to ones generally used in a communications system applying a CDM technique, and thus the detailed description thereon will be omitted.

The operational circuit 30 includes an adder 32, a bit selector 34 and an offset calculator 36, which are interconnected as depicted. The operational circuit 30 can be configured of a field programmable gate array (FPGA), by way of example.

The adder 32 is adapted to add on a chip-by-chip basis the coded transmission data S103-1 to S103-N corresponding in number to the N channels input to the operational circuit 30, thereby producing added data, which is indicated by an arrow S105 in the figure. Since the coded transmission data S103-1 to S103-N are binary data of "0" or "1", the added data S105 will be an (N+1)-valued signal that takes on any of the values from 0 to N on a chip-by-chip basis.

The bit selector 34 is configured to produce pieces of bit transmission data, shown with arrows S107-1 to S107-M in the figure, which correspond in number to the bit positions of the added data S105 when expressed in binary form, where M is an integer equal to or greater than one. Note that the added data S105 in binary notation will be referred to as binary data in the following description.

The bit transmission data S107-1 to S107-M are electrical signals indicative of the value of the respective bits. That is, the first to M-th bit transmission data S107-1 to S107-M represent the value of the $2^0$-th to $2^{M-1}$-th bits of the binary-data.

In the illustrative embodiment, the number of bit positions M of the binary data is assigned the minimum integer which satisfies an expression $N+1 \leq 2^M$ where N represents the number of the channels of the input transmission data S101-1 to S101-N. For example, when the N is 15, then the number of bit positions M of the binary data is 4.

The modulator unit 40 comprises a plurality (M) of modulators 42-1 to 42-M corresponding in number to the M bit positions of the binary data. By way of example, a k-th modulator 42-$k$, where k is an integer of 1 to M, modulates the k-th bit of the transmission data S107-$k$ to produce a k-th bit modulated signal, shown with an arrow S109-$k$ in the figure, the amplitude level of the k-th bit modulated signal being $2^{k-1}$. The first to M-th bit modulated signal S109-1 to S109-M thus produced are supplied to the multiplexer 50.

Note that the modulators 42-1 to 42-M may be any suitable modulators if they have a modulation function capable to modulate signals into a desired amplitude, and therefore a person skilled in the art can easily configure them by applying a conventional technique.

The multiplexer 50 is dedicated to multiplex the first to M-th bit modulated signal S109-1 to S109-M to produce a CDM signal, which is represented by an arrow S111 in FIG. 1.

Next, the operation of the CDM signal transmitter 10 will be described with reference to FIGS. 2A-2I. FIGS. 2A-2I are directed to an example of the operation with three channels. When the number of channels is three, the added data S105 acquired by adding the coded transmission data S103-1 to S103-3 takes on values from zero to three, inclusive, on the chip-by-chip basis. Thus, if the added data S105 is expressed in binary form, the number of bit positions M is two.

Figure 2A:
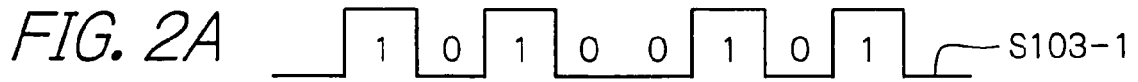
FIGS. 2A-2I are a timing chart useful for understanding a code division multiplexing method in accordance with the present invention.
Figure 2B:
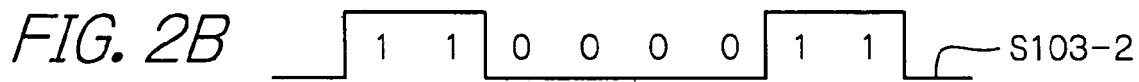
Figure 2C:
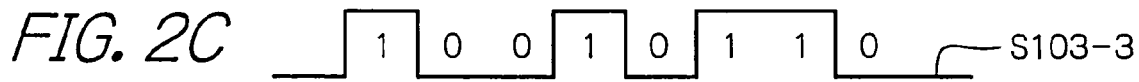
Figure 2D:
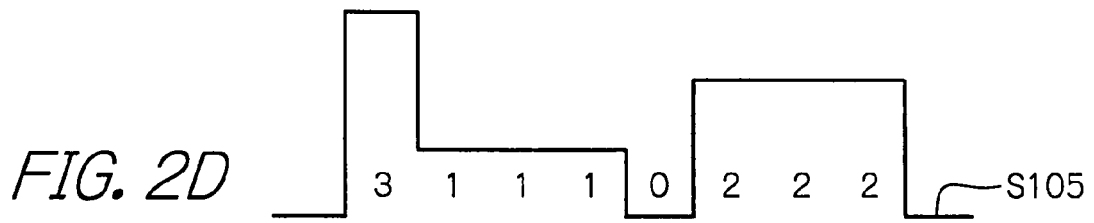
Figure 2E:
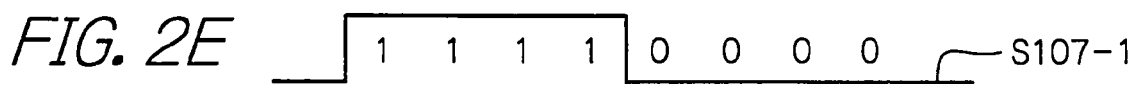
Figure 2F:
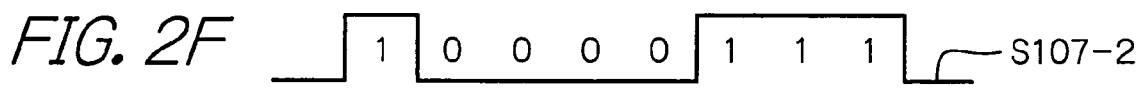
Figure 2G:
Figure 2H:
Figure 2I:
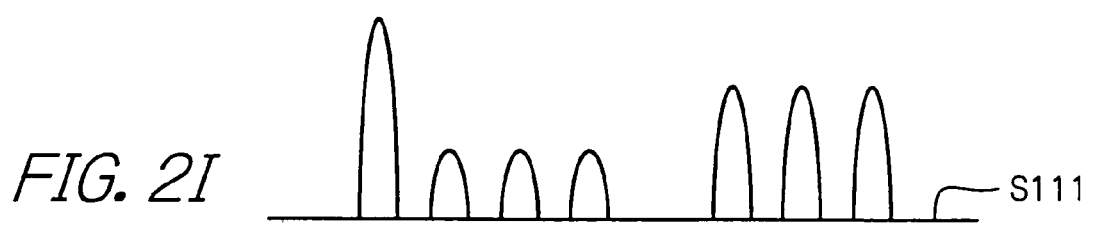

FIGS. 2A-2I are a timing chart useful for understanding the code division multiplexing method using three channels. Specifically, FIGS. 2A to 2I show the time and signal intensity in an arbitrary scale on the horizontal and vertical axes, respectively. More specifically, FIGS. 2A, 2B and 2C illustrate the first to third coded transmission data S103-1, S103-2 and S103-3, respectively. FIG. 2D depicts the added data S105, and FIGS. 2E and 2F show the first and second bit transmission data S107-1 and S107-2, respectively. FIGS. 2G and 2H represent the first and second modulated signals S109-1 and S109-2, respectively, while FIG. 2I shows the CDM signal S111.

Assume that when the first transmission data S101-1 is spread and coded by the first encoder 22-1, the resultant first coded transmission data S103-1 is "10100101", see FIG. 2A.

Likewise, when the second transmission data S101-2 is spread and coded by the second encoder 22-2, the obtained second coded transmission data S103-2 is "11000011", see FIG. 2B. Furthermore, when the third transmission data S101-3 is spread and coded by the third encoder 22-3, the third coded transmission data S103-3 is "10010110", see FIG. 2C.

The adder 32 adds or sums up the first to third coded transmission data S103-1 to S103-3 to each other on the chip-by-chip basis to obtain the added data S105, see FIG. 2D. The added data S105 becomes "31110222".

The bit selector 34 uses the added data S105 to produce the first to second bit transmission data S107-1 to S107-2.

The first bit transmission data S107-1 represents the value of the $2^0$-th bit of the binary data when the added data S105 is expressed in binary form, i.e. the resultant data becomes "11110000", see FIG. 2E. The second bit transmission data S107-2 represents the value of the $2^1$-th bit of the binary data and is "10000111", see FIG. 2F.

The first modulator 42-1 modulates the first bit transmission data S107-1 to produce the first bit modulated signal S109-1, see FIG. 2G. The amplitude level of the first bit modulated signal S109-1 is 1(=$2^0$).

The second modulator 42-2 modulates the second bit transmission data S107-2 to produce the second bit modulated signal S109-2, see FIG. 2H. The amplitude level of the second bit modulated signal S109-2 is 2(=$2^1$).

The multiplexer 50 multiplexes the first to second bit modulated signals S109-1 to S109-2 to thereby produce the CDM signal S111, FIG. 2I. The amplitude level of the CDM signal Sill ranges from 0 to 3.

In summary, the code division multiplex signal transmitter in accordance with the illustrative embodiment of the invention is configured to produce added data by adding transmission data on a plurality (N) of channels to each other to produce resultant added data and modulating pieces of bit transmission data which are indicative of the values of the respective bits of the added data, when expressed in binary form, the pieces of bit transmission data being equal in number to the bit positions of the added data expressed in binary form. Thus, the modulators required can be reduced in number since the number of bit positions M of the binary data with respect to the N channels is given by the minimum integer satisfying the relationship $N+1 \leq 2^M$. For example, if the number of channels is 15, the number of modulators is then 4. Thus, the signals to be multiplexed by the multiplexer 50 can be decreased, thereby reducing the circuit size of the multiplexer 50.

Next, the operation of the offset adjuster 60 and the offset calculator 36 included in the operational circuit 30 will be described.

The offset calculator 36 calculates the amount of offset adjustment A(N) according to the number of channels N by using following formula (1):

$$A(N)=0.5 \times (2^{a+1}-1-N) \qquad (1)$$

where a is an integer satisfying $2^a \leq N \leq 2^{a+1}-1$.

The offset adjuster 60 uses the amount of offset adjustment A(N) thus obtained by the offset calculator 36 to adjust the offset value of the CDM signal S111.

In the following, the formula (1) for calculating the offset amount A(N) will be described. Assuming that, in the added data S105 resultant from adding the first to N-th coded transmission data S103-1 to S103-N, the probability of appearance of an amplitude level i is represented by P(i). In a binary signal taking its value "0" or "1", the probability of appearance of the value "1" is referred to as a mark ratio r. Now, assuming that the mark ratios r of the first to N-th coded transmission data S103-1 to S103-N are equally 0.5, then the probability P(i) is expressed by P(i)=${}_NC_i/2^N$ because the probability P(i) follows a binominal distribution.

Assuming also that, when the amplitude level i is represented as a binary number, the value of the $2^j$-th bit is represented by $Q_j(i)$, where j is an integer from 0 to 1, inclusive, then the mark ratios $r_j$ of the first to N-th bit transmission data S107-1 to S107-N are expressed by the following formula (2):

$$r_j = \sum_{i=0}^{N} P(i) Q_j(i) \qquad (2)$$

By way of example, if the N is equal to 3, the solutions are P(0)=${}_3C_0/2^3$=⅛, P(1)=${}_3C_1/2^3$=⅜, P(2)=${}_3C_2/2^3$=⅜, and P(3)=${}_3C_3/2^3$=⅛. With regard to $Q_j(i)$, the solutions are $Q_0(0)$=0, $Q_0(1)$=1, $Q_0(2)$=0, $Q_0(3)$=1, $Q_1(0)$=0, $Q_1(1)$=0, $Q_1(2)$=1 and $Q_1(3)$=1.

Hence, the mark ratio $r_0$ of the first bit transmission data S107-1 obtained by the above formula (2) is $r_0$=⅛×0+⅜×1+⅜×0+⅛×1=½. The mark ratio $r_1$ of the second bit transmission data S107-2 is $r_1$=⅛×0+⅜×0+⅜×1+⅛×1=½.

Likewise, when a calculation is made by using the formula (2) with regard to a case where N is equal to 4, the mark ratio $r_0$ of the first bit transmission data S107-1 is $r_0$=½, the mark ratio $r_1$ of the second bit transmission data S107-2 is $r_1$=⅝ and the mark $r_2$ of the third bit transmission data S107-3 is $r_2$=1/16. In general, a signal of which the mark ratio r is other than 0.5, an offset caused by a direct current (DC) component, i.e. a DC offset, occurs in such signal. The DC offset is superimposed on the CDM signal produced by the CDM signal transmitter, so that the DC level of the CDM signal S111 will vary. For instance, assume that the first bit modulated signal S109-1 produced by the first modulator 42-1 has an amplitude level of 1, the calculation performed to determine a DC offset D(N) of the CDM signal in the case where N is 4 gives a result that $$D(N)=-1.5(=2^0 \times (½-0.5)+2^1 \times (⅝-0.5)+2^2 \times (1/16-0.5)).$$

Figure 3:
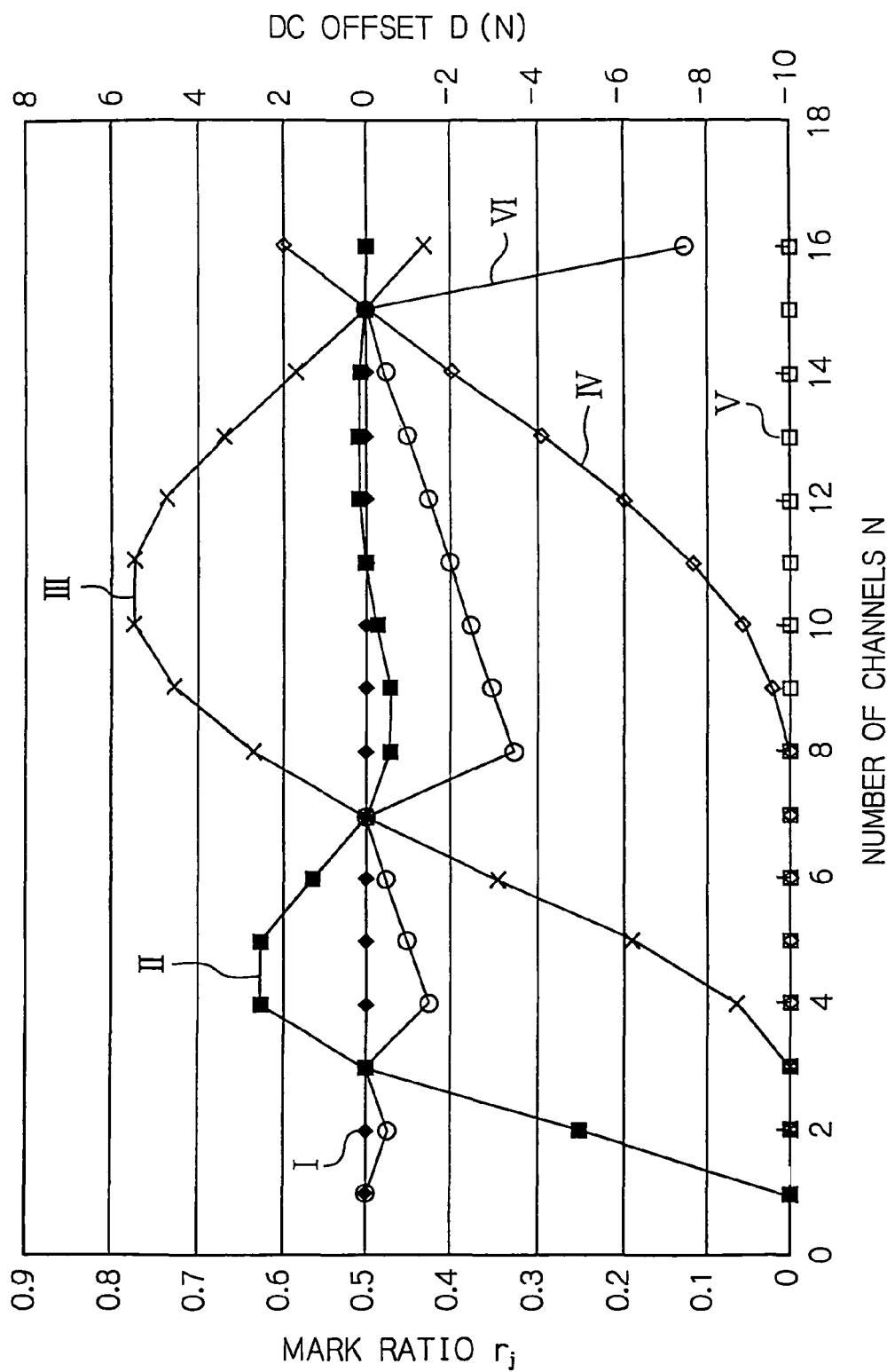
FIG. 3 is a schematic diagram plotting the mark ratio and the offset amount with respect to the number of channels.

In the same way, the mark ratios $r_j$ and the DC offsets D(N) are obtained in relation to the cases where the channel number N is in the range of 1 to 16. FIG. 3 plots the calculation results of the mark ratios $r_j$ and DC offsets D(N) for the channels. In the figure, the horizontal axis denotes the number of channels N while the vertical axes denote the mark ratio $r_j$ and the DC offsets D(N). Furthermore, reference numerals I to V in FIG. 3 indicate the mark ratios $r_0$ to $r_4$ of the $2^0$ to $2^4$-the bit positions, respectively. Reference numeral VI represents the DC offset D(N).

If the channel numbers N is $N=2^b-1$, where b is a positive integer, the mark ratio $r_j$ is 0.5, or otherwise the mark ratio $r_j$ takes a value other than 0.5.

If the mark ratio $r_j$ takes a value other than 0.5, the DC offset D(N) becomes other than zero, so that the DC level of the CDM signal S111 shifts in response, possibly resulting in an occurrence of data errors.

In order to prevent the occurrence of data errors, the offset adjuster 60 and the offset calculator 36 in the operational circuit 30 are used to adjust the offset.

The offset calculator 36 calculates the amount of offset adjustment A(N) to be used for cancelling the DC offset D(N), and the amount of offset adjustment A(N) can be expressed by the aforementioned formula (1).

The amount of offset adjustment A(N) thus calculated by the offset calculator 36 is delivered in the form of digital signal, indicated by an arrow S113 in FIG. 1, to the offset adjuster 60. The offset signal S113 sent to the offset adjuster 60 is then converted into a corresponding analog DC voltage signal by a digital-to-analog converter (DAC) 62. The obtained analog DC voltage signal is sent through an inductor winding 64 and superimposed on the CDM signal S111, and thereby the adjusted CDM signal represented as S115 in the figure is output from the CDM signal transmitter 10. Consequently, the offset adjustment is accomplished in response to the shift of the DC level, i.e. offset level, of the CDM signal S111.

The above-mentioned formula (1) is programmed beforehand in the FPGA, not shown, constituting the operational circuit 30. In addition, a table containing the results of previously-made calculations of offset adjustment amounts A(N) for the number of channels N may be readably stored in an adequate storage device, thereby allowing the offset calculator 36 to readout a suitable offset adjustment amount A(N) for the number of channels N.

As described above, the CDM signal transmitter includes the offset adjuster and the operational circuit has the offset calculator, so that even if a DC offset is involved in a CDM signal depending on the number of channels N, the DC offset can easily be corrected.

It is to be noted that FIG. 1 shows an exemplified configuration where the adder 32 is adapted to count the number of channels N to thereby supply a resultant count to the offset calculator 36, but the invention is not specifically limited thereto. Alternatively, the operational circuit 30 may be provided with a channel number counter, by way of example.

The entire disclosure of Japanese patent application No. 2008-174646 filed on Jul. 3, 2008, including the specification, claims, accompanying drawings and abstract of the disclosure is incorporated herein by reference in its entirety.

While the present invention has been described with reference to the particular illustrative embodiment, it is not to be restricted by the embodiment. It is to be appreciated that those skilled in the art can change or modify the embodiment without departing from the scope and spirit of the present invention.

What is claimed is:

1. A code division multiplex signal transmitter comprising:
an operational circuit for adding up input coded transmission data on a plurality (N) of channels, where N is a natural number more than unity, to produce resultant added data, and for producing pieces of bit transmission data which are indicative of values of respective bits of the added data, when expressed in binary form, the pieces of bit transmission data being equal in number to a number (M) of bit position or positions of the added data when expressed in the binary form, where M is a natural number not less than unity;
a modulator unit including a modulator or modulators corresponding in number to the number (M) of the bit position or positions of the added data,
a k-th modulator, where k is an integer of 1 to M, inclusive, modulating a k-th piece of bit transmission data to produce a k-th bit modulated signal whose maximum amplitude level is equal to $2^{k-1}$; and
a multiplexer for multiplexing first to M-th bit modulated signals to produce a code division multiplex signal;
wherein said operational circuit comprises:
an adder for adding up the input coded transmission data on the plurality (N) of channels to produce the added data; and
a bit selector for producing the pieces of bit transmission data indicative of the values of the respective bits of the added data and equal in number to the number (M) of the bit position or positions of the added data;
wherein said operational circuit further comprises an offset calculator for calculating an amount of offset adjustment A(N) in respect of the plurality (N) of channels by using a formula of $$A(N)=0.5\times(2^{a+1}-1-N),$$

where a is an integer satisfying $2^a \leqq N \leqq 2^{a+1}-1$,
said transmitter further comprising an offset adjuster for adjusting a direct current level of the code division multiplex signal according to the amount of offset adjustment A(N).

2. The code division multiplex signal transmitter in accordance with claim 1, further comprising an encoder unit including a corresponding plurality (N) of encoders each having a unique code for encoding transmission data on the plurality of channels to output the input coded transmission data to said adder.

3. A code division multiplexing method comprising the steps of:
adding up input coded transmission data on a plurality (N) of channels, where N is a natural number more than unity, to produce resultant added data;
producing pieces of bit transmission data which are indicative of values of respective bits of the added data, when expressed in binary form, the pieces of bit transmission data being equal in number to a number (M) of bit position or positions of the added data when expressed in the binary form, where M is a natural number not less than unity;
modulating a k-th piece of bit transmission data, where k is an integer of 1 to M, inclusive, to produce a k-th bit modulated signal whose maximum amplitude level is equal to $2^{k-1}$; and
multiplexing first to M-th bit modulated signals to produce a code division multiplex signal;
calculating an amount of offset adjustment A(N) in respect of the plurality (N) of channels by using a formula of $$A(N)=0.5\times(2^{a+1}-1-N),$$

where a is an integer satisfying $2^a \leqq N \leqq 2^{a+1}-1$; and
adjusting a direct current level of the code division multiplex signal according to the amount of offset adjustment A(N).

* * * * *